US006607437B2

(12) United States Patent
Casey et al.

(10) Patent No.: US 6,607,437 B2
(45) Date of Patent: Aug. 19, 2003

(54) SELECTION FEATURE FOR A GAME OF CHANCE

(75) Inventors: Michael P. Casey, Chicago, IL (US); Jason C. Gilmore, Bartlett, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 09/918,052

(22) Filed: Jul. 30, 2001

(65) Prior Publication Data

US 2002/0025844 A1 Feb. 28, 2002

Related U.S. Application Data

(60) Provisional application No. 60/228,001, filed on Aug. 25, 2000.

(51) Int. Cl.[7] .................................. A63F 13/00
(52) U.S. Cl. .................................. 463/16; 463/17
(58) Field of Search .................................. 463/16, 17, 18, 463/19, 20, 21, 22, 30, 31, 32, 33, 34; 273/143 R, 273, 293

(56) References Cited

U.S. PATENT DOCUMENTS

| | | | | | |
|---|---|---|---|---|---|
| 5,393,057 A | * | 2/1995 | Marnell, II | 273/85 |
| 5,855,514 A | * | 1/1999 | Kamille | 463/17 |
| 5,931,467 A | * | 8/1999 | Kamille | 273/139 |
| 5,935,002 A | * | 8/1999 | Falciglia | 463/19 |
| 6,015,346 A | | 1/2000 | Bennett | 463/20 |
| 6,089,976 A | | 7/2000 | Schneider et al. | 463/16 |
| 6,102,798 A | | 8/2000 | Bennett | 463/16 |
| 6,120,378 A | * | 9/2000 | Moody et al. | 463/20 |
| 6,168,523 B1 | * | 1/2001 | Piechowiak et al. | 463/26 |
| 6,190,255 B1 | | 2/2001 | Thomas et al. | 463/20 |
| 6,220,959 B1 | * | 4/2001 | Holmes, Jr. et al. | 463/13 |
| 6,261,177 B1 | | 7/2001 | Bennett | 463/16 |
| 6,309,300 B1 | * | 10/2001 | Glavich | 463/26 |
| 6,315,660 B1 | * | 11/2001 | DeMar et al. | 463/16 |
| 6,315,664 B1 | * | 11/2001 | Baerlocher et al. | 463/21 |
| 6,319,124 B1 | * | 11/2001 | Baerlocher et al. | 463/20 |
| 6,346,043 B1 | * | 2/2002 | Colin et al. | 463/17 |
| 6,347,996 B1 | * | 2/2002 | Gilmore et al. | 463/17 |
| 6,364,766 B1 | * | 4/2002 | Anderson et al. | 463/16 |
| 6,364,767 B1 | * | 4/2002 | Brossard et al. | 463/20 |
| 6,364,768 B1 | * | 4/2002 | Acres et al. | 463/25 |
| 6,406,369 B1 | * | 6/2002 | Baerlocher et al. | 463/20 |
| 6,428,412 B1 | * | 8/2002 | Anderson et al. | 463/9 |
| 6,435,509 B2 | * | 8/2002 | Wichinsky et al. | 273/292 |
| 6,443,456 B1 | * | 9/2002 | Gajor | 273/303 |
| 6,443,837 B1 | | 9/2002 | Jaffe et al. | 463/16 |

FOREIGN PATENT DOCUMENTS

| | | | |
|---|---|---|---|
| WO | WO 98/09258 | 3/1998 | G07F/17/34 |
| WO | WO 98/09259 | 3/1998 | G07F/17/34 |
| WO | WO 01/19475 A1 | 3/2001 | A63F/9/24 |

OTHER PUBLICATIONS

Brochure for "Cash Crop", WMS Gaming Inc., Chicago, Illinois, 2 pages, undated.
Brochure for "Instant Winner", WMS Gaming Inc., Chicago, Illinois, 2 pages, 1999.
Brochure for "Jackpot Party Video 9–Line", WMS Gaming Inc., Chicago, Illinois, 2 pages, undated.

* cited by examiner

*Primary Examiner*—Gene Mancene
*Assistant Examiner*—Frederick C. Nicolas

(57) ABSTRACT

A game of chance is conducted on a gaming machine including a video display and controlled by a processor in response to a wager. The game includes a plurality of selectable elements depicted on the video display. A player successively selects the displayed elements. After selecting an element of a predetermined type and prior to selecting another element, one or more of the elements that have not yet been selected are disabled such that the disabled elements cannot be subsequently selected. The plurality of elements are preferably displayed in a plurality of groups. After selecting the element of the predetermined type, all of the elements in the group containing that element are disabled.

13 Claims, 9 Drawing Sheets

SELECTION FEATURE FOR A GAME OF CHANCE

REFERENCE TO RELATED APPLICATIONS

This application makes a claim for priority of U.S Provisional Application No. 60/228,001 filed Aug. 25, 2000.

FIELD OF THE INVENTION

The present invention relates generally to games of chance conducted on gaming machines and, more particularly, to a selection feature for a game of chance.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A game of chance is conducted on a gaming machine including a video display and controlled by a processor in response to a wager. The game includes a plurality of selectable elements depicted on the video display. A player successively selects the displayed elements. After selecting an element of a predetermined type and prior to selecting another element, one or more of the elements that have not yet been selected are disabled such that the disabled elements cannot be subsequently selected. The plurality of elements are preferably displayed in a plurality of groups. After selecting the element of the predetermined type, all of the elements in the group containing that element are disabled.

BRIEF DESCRIPTION OF THE DRAWINGS

The foregoing and other advantages of the invention will become apparent upon reading the following detailed description and upon reference to the drawings in which.

Figure 1:
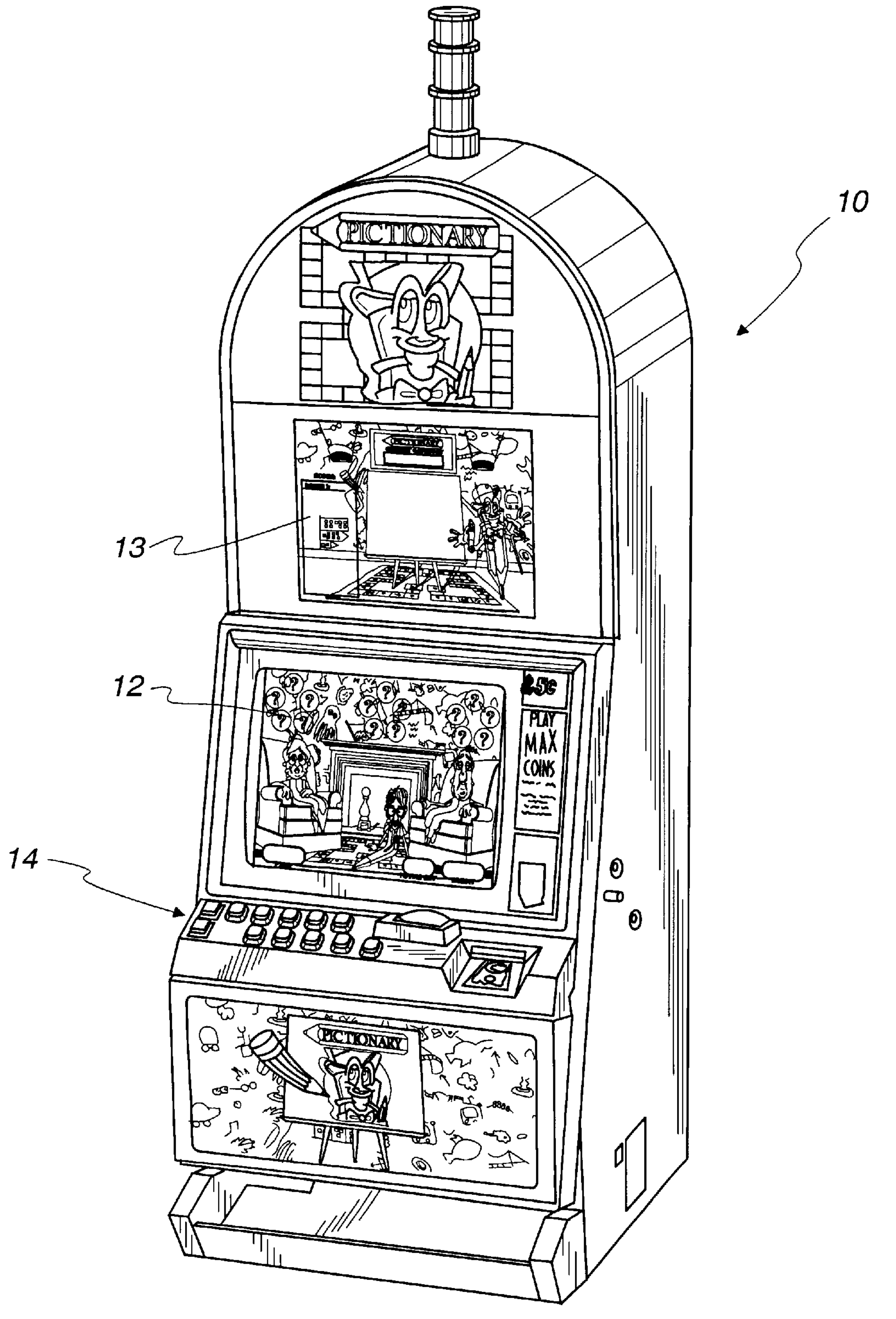
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 operable to play a game of chance having a theme based on the PICTIONARY® board game. The game of chance features a basic slot game with five simulated spinning reels and a bonus game triggered by a start-bonus outcome in the basic slot game. The gaming machine 10 includes lower and upper visual displays 12 and 13 preferably in the form of a dot matrix, CRT, LED, LCD, electro-luminescent, or other type of video display known in the art. The lower display 12 preferably includes a touch screen overlaying the monitor. In the illustrated embodiment, the gaming machine 10 is an "upright" version in which both the lower and upper displays 12 and 13 are oriented vertically relative to the player. Alternatively, the gaming machine may be a "slant-top" version in which the lower display 12 is slanted at about a thirty-degree angle toward the player of the gaming machine 10 and the upper display 13 is oriented vertically relative to the player.

Figure 2:
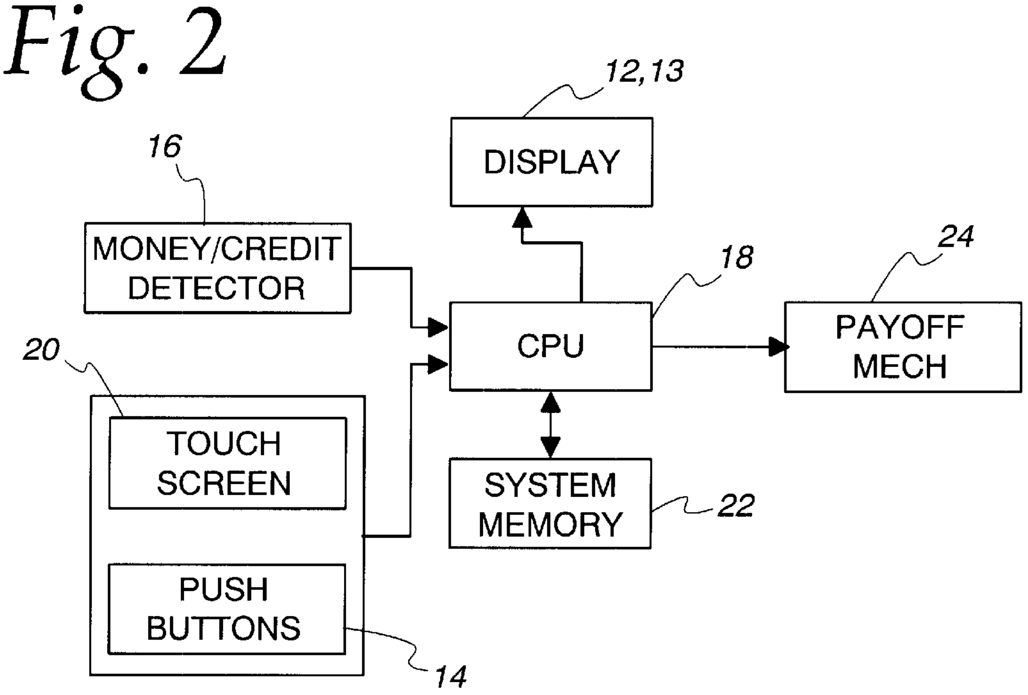
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes causes the CPU 18 to enter a bonus mode whereby the display 12 shows a bonus selection game.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic or bonus games. The payoff may be provided in the form of coins, bills, tickets, coupons, cards, etc. The payoff amounts are determined by one or more pay tables stored in the system memory 22.

Figure 3:
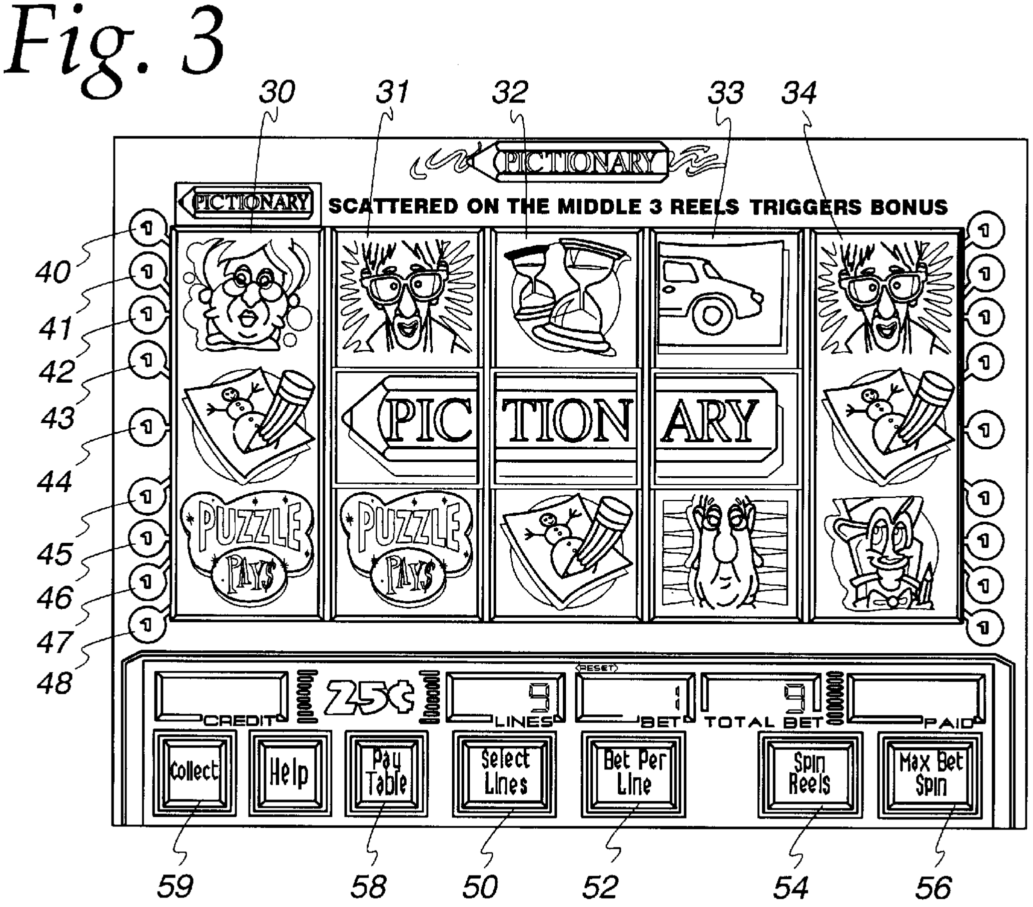
FIG. 3 is a display screen capture associated with a basic slot game and showing a symbol combination for triggering a bonus selection game.

Referring to FIG. 3, the basic game is implemented on the display 12 on five video simulated spinning reels 30–34 with nine pay lines 40–48. Each of the pay lines 40–48 extends through one symbol on each of the five reels 30–34. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels 30–34 may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels 30–34 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 59. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-bonus outcome for triggering play of a bonus game. A start-bonus outcome may be defined in any number of ways. For example, a start-bonus outcome occurs when a special start-bonus symbol or a special combination of symbols appears on one or more of the reels 30–34. The start-bonus outcome may require the combination of symbols to appear along an active pay line, or may alternatively require that the combination of symbols appear anywhere on the display regardless of whether the symbols are along an active pay line. The appearance of a start-bonus outcome causes the CPU to shift operation from the basic game to the bonus selection game. In the embodiment illustrated in FIG. 3, three or more PICTIONARY logo symbols in any position on any reels trigger the bonus selection game.

Figure 4:
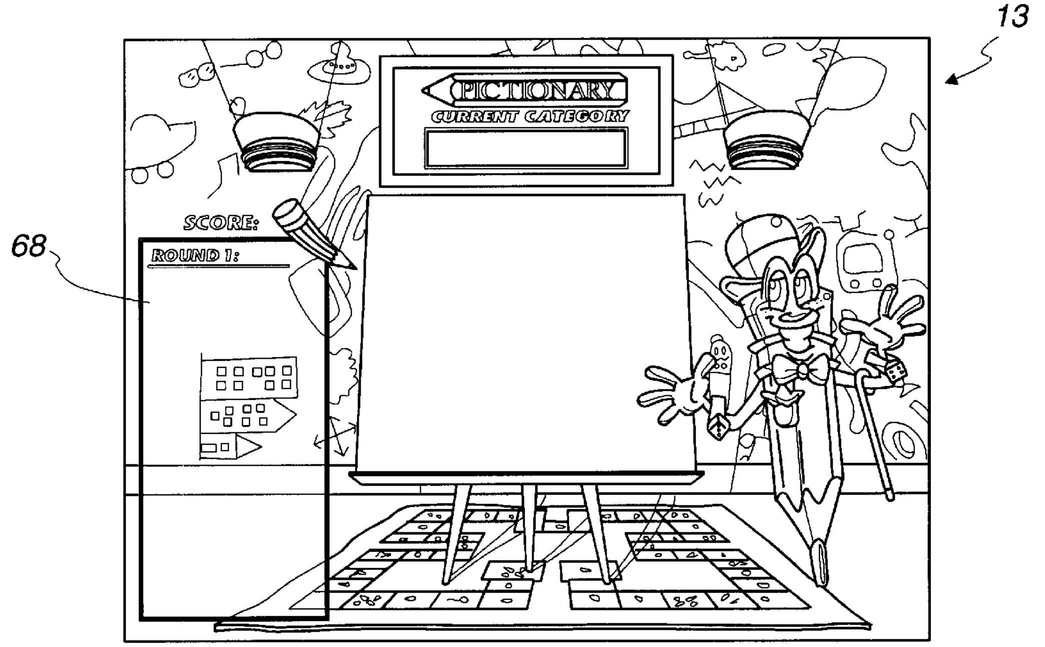
FIGS. 4 through 17 are display screen captures associated with the bonus selection game.
Figure 5:
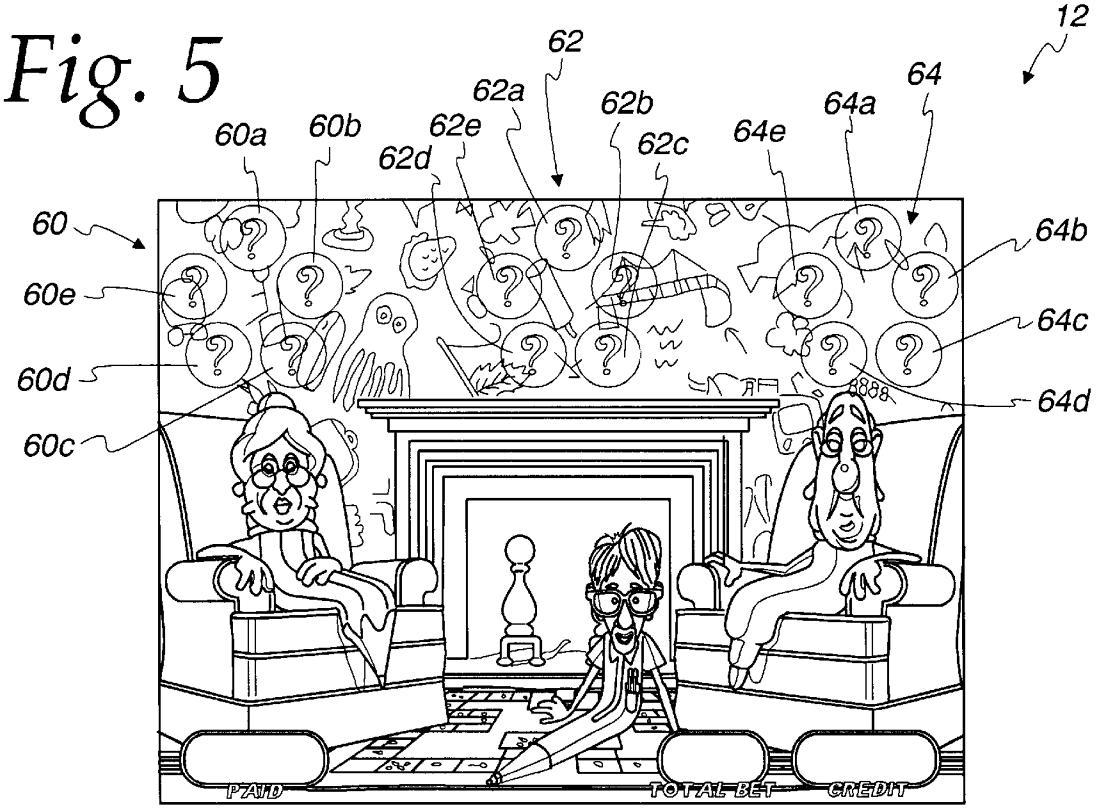

Referring to FIGS. 4 and 5, the bonus selection game is based on the board game entitled PICTIONARY. On the upper display 13 (FIG. 4) Mr. Pictionary stands adjacent to an easel. Mr. Pictionary welcomes the player to the bonus selection game and states, "Welcome to the Pictionary Bonus! I'm Mr. Pictionary. Are you ready to play? Let's see what our first category is." While Mr. Pictionary stands adjacent to the easel on the upper display 13, on the lower display 12 (FIG. 5) three computer characters sit on and around chairs in a living room of a house.

Figure 6:
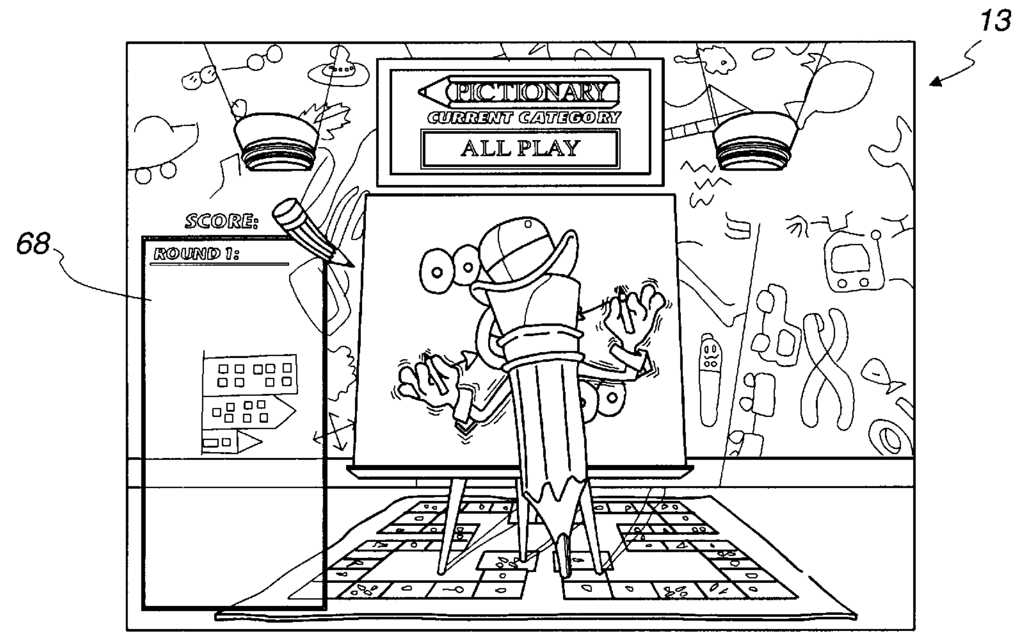
Figure 7:
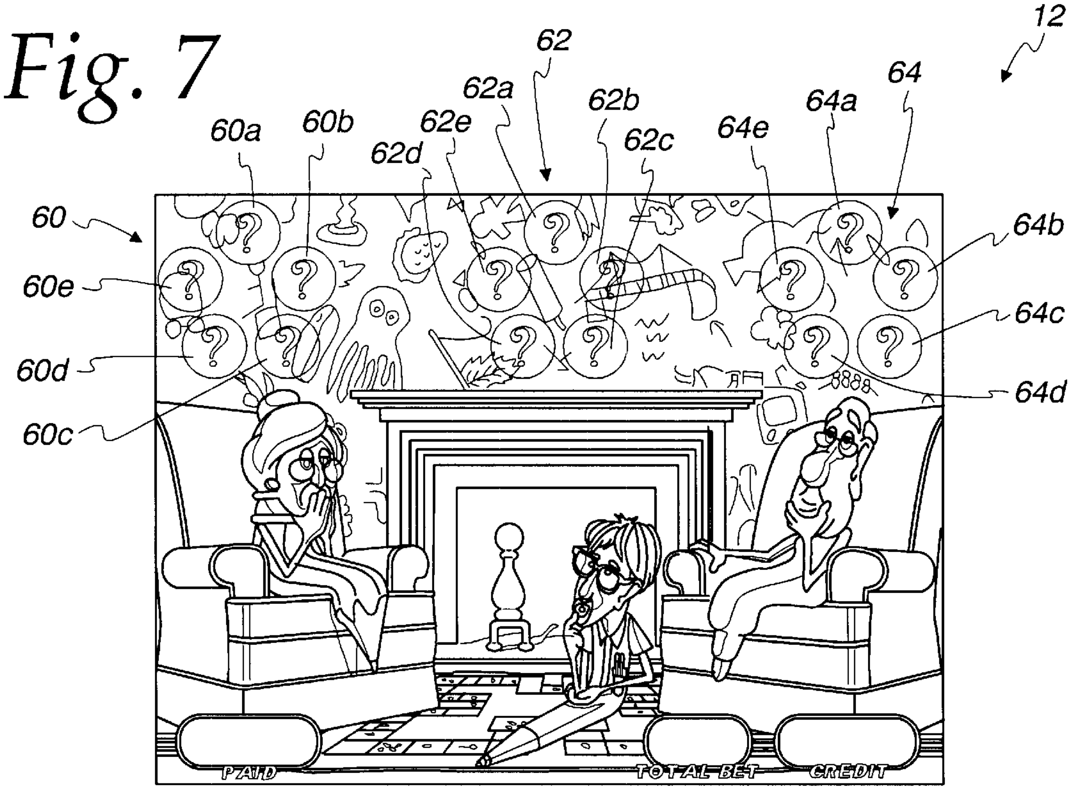

Referring to FIGS. 6 and 7, on the upper display 13 (FIG. 6) the All Play or Object category on the Pictionary placard above the easel flips over and lights up. Mr. Pictionary springs to the easel and draws a picture denoting a word. The three characters on the lower display 12 (FIG. 7) begin shaking their heads, thinking, and shrugging their shoulders.

Figure 8:
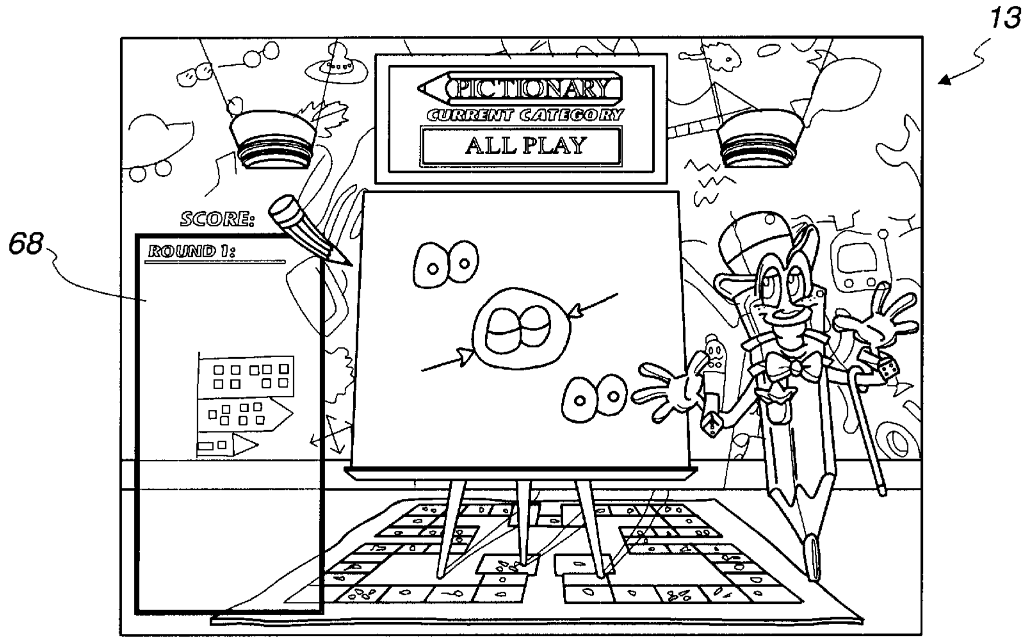
Figure 9:
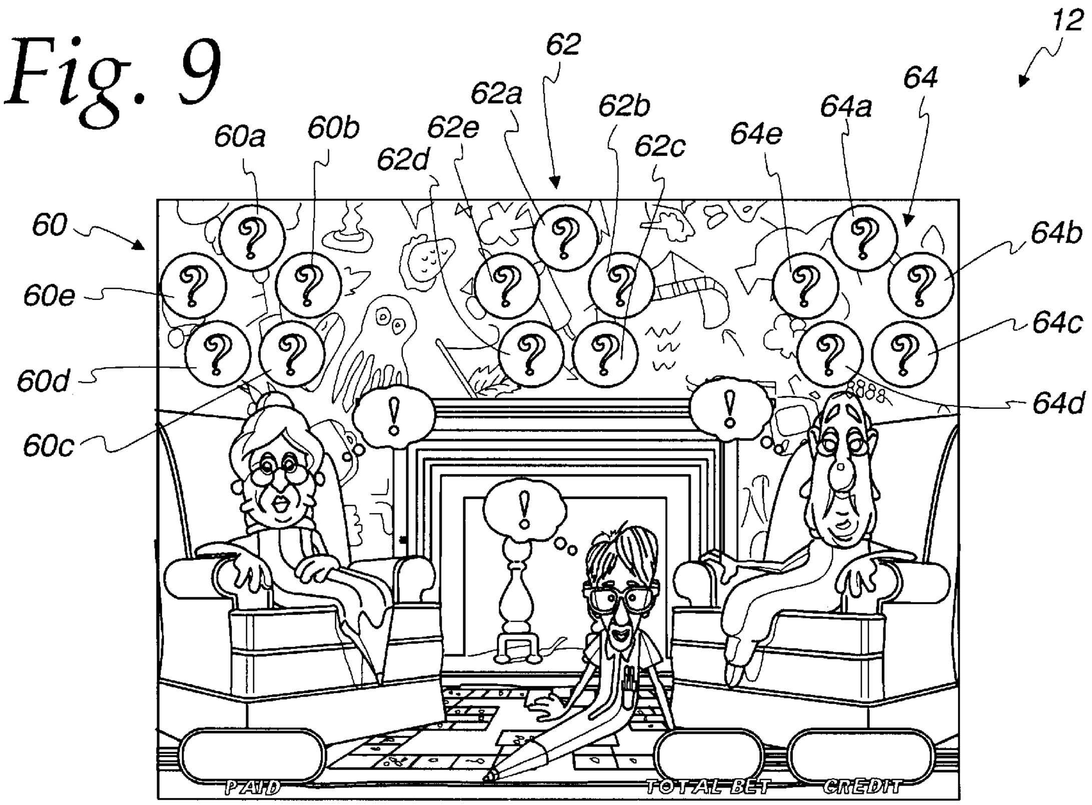

Referring to FIGS. 8 and 9, on the upper display 13 (FIG. 8) Mr. Pictionary finishes drawing the picture. When Mr. Pictionary is finished drawing the picture, a group of five selectable elements appears above each character's head on the lower display 12 (FIG. 9) to signify that each character has potential guesses as to the word represented by the picture. Mr. Pictionary then prompts the player to select any of the five selectable elements above any of the three computer characters to reveal a guess and a type of guess. Thus, the player can initially select any of a combined total of fifteen selectable elements above the three computer characters. Each selectable element is represented by a circular tile or bubble containing a question mark "?". The three groups of five selectable elements per group are identified by the respective reference numerals 60, 62, and 64. The selectable elements in the group 60 are identified by the reference numerals 60*a*, 60*b*, 60*c*, 60*d*, and 60*e*; the selectable elements in the group 62 are identified by the reference numerals 62*a*, 62*b*, 62*c*, 62*d*, and 62*e*; and the selectable elements in the group 64 are identified by the reference numerals 64*a*, 64*b*, 64*c*, 64*d*, and 64*e*. Upon selection, each selectable element may reveal one of three types of guesses: (1) a bad guess, (2) a close but incorrect guess, or (3) a correct guess.

Figure 10:
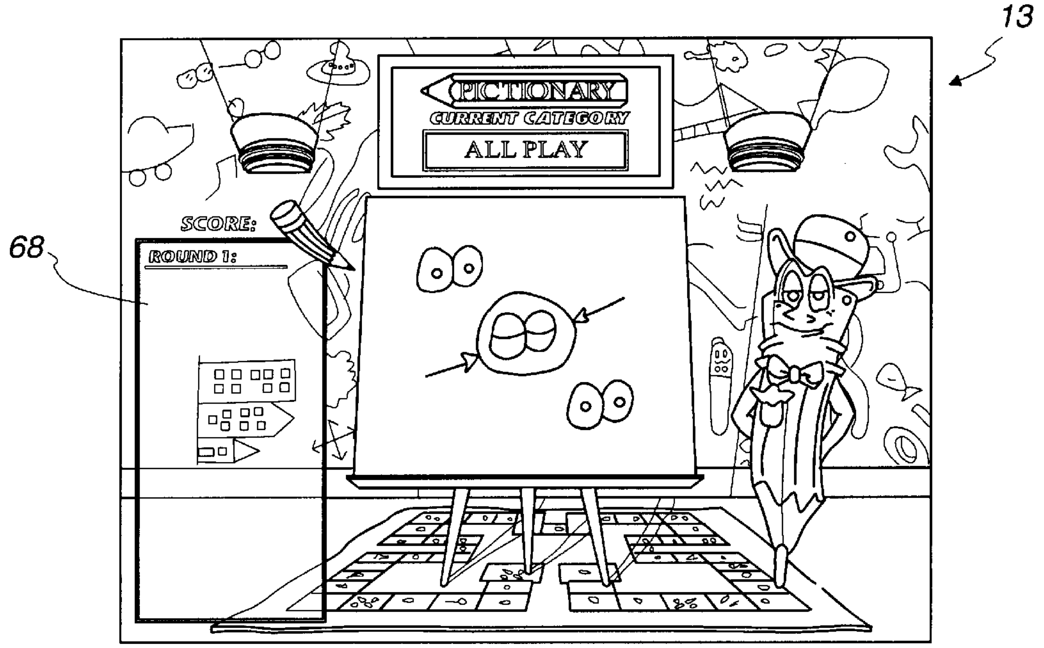
Figure 11:
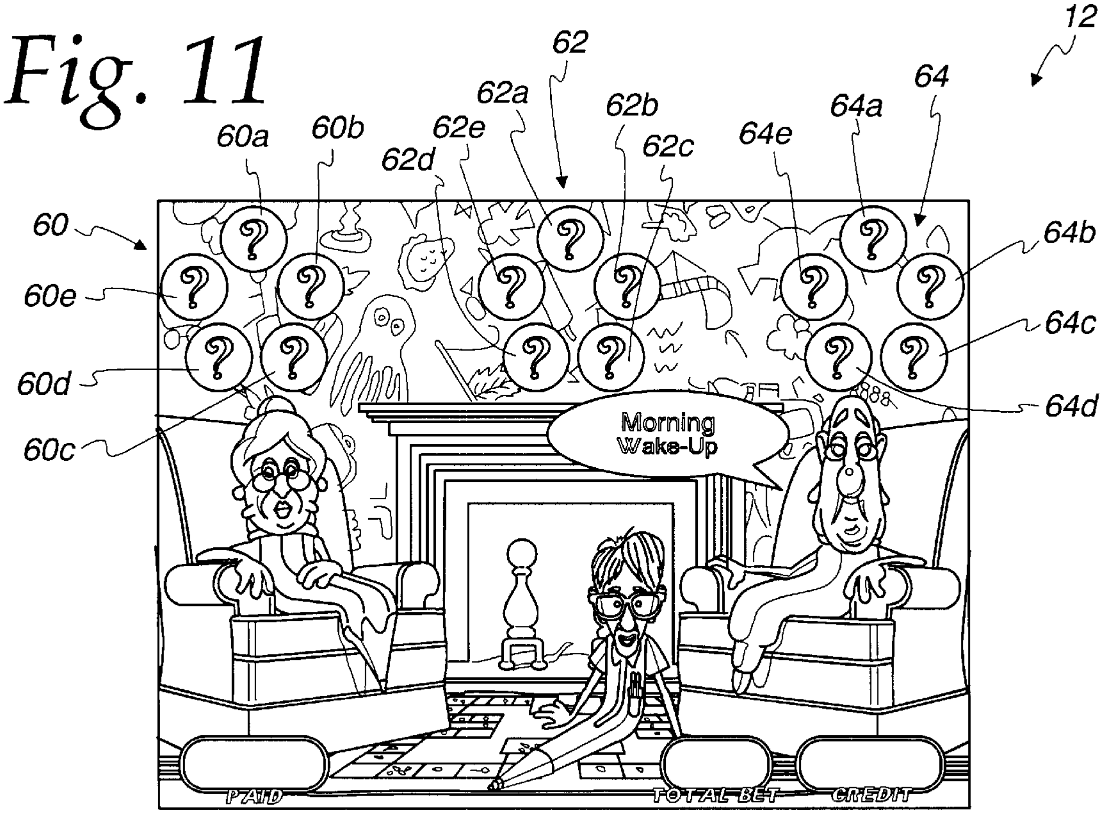
Figure 12:
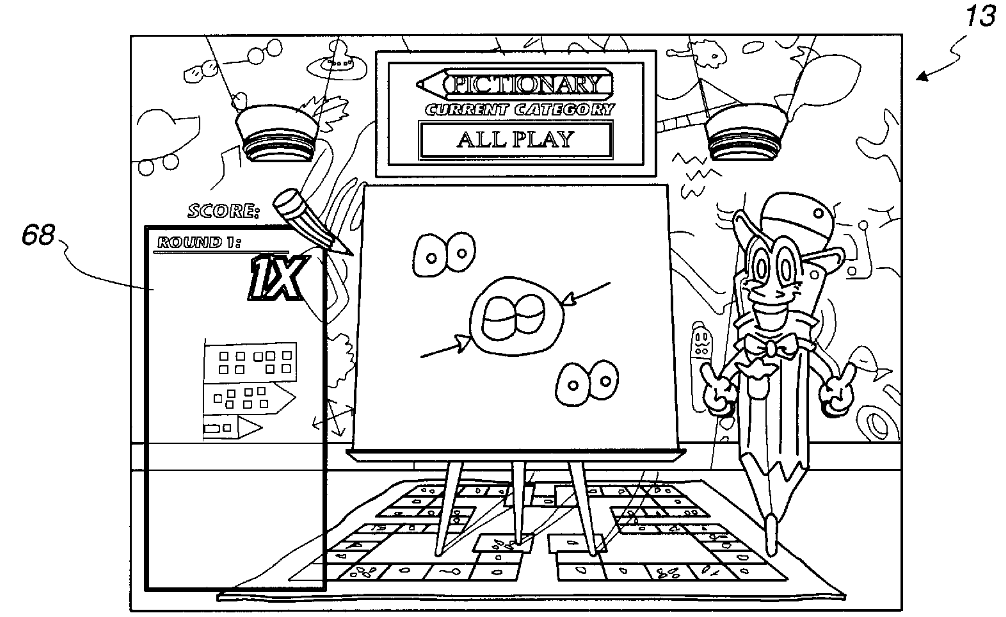
Figure 13:
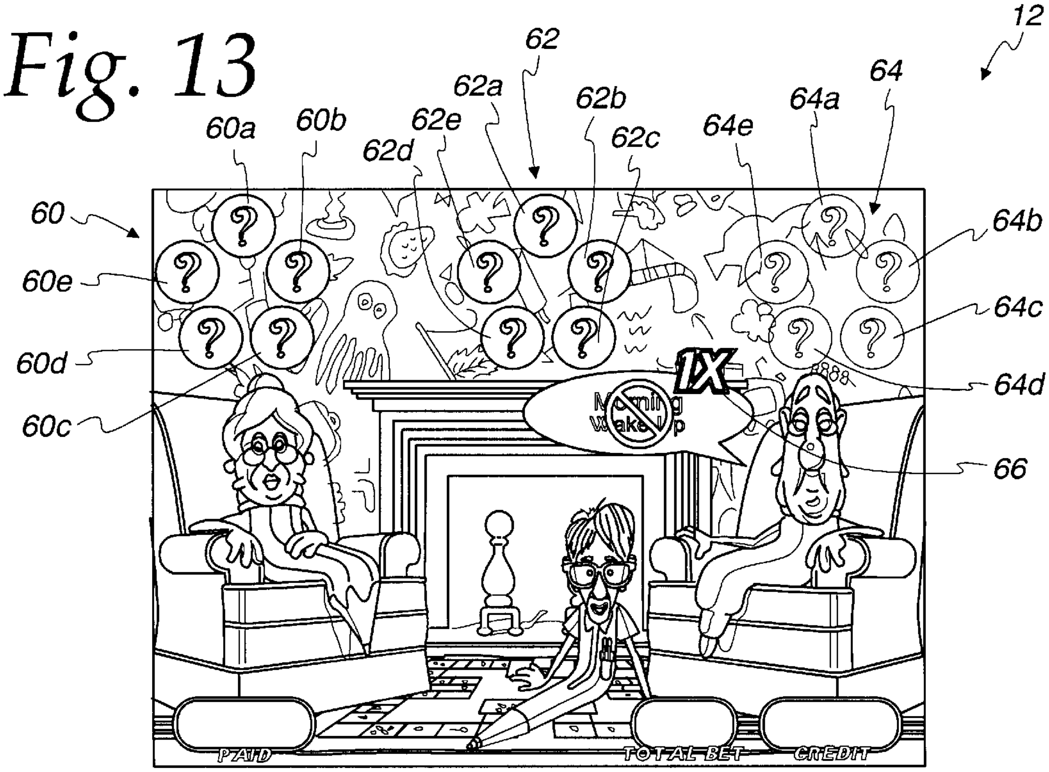

Referring to FIGS. 10, 11, 12, and 13, if a selected element triggers a bad guess (e.g., "Morning Wake-Up"), on the upper display 13 (FIGS. 10 and 12) Mr. Pictionary reacts to the bad guess unenthusiastically as best shown in FIG. 10. On the lower display 12 (FIGS. 11 and 13) a payout 66 is revealed next to the character associated with the bad guess as best shown in FIG. 13. The payout may be in the form of a credit amount or a multiplier multiplied by the total wager. The payout is added to a scorecard 68 as shown in FIG. 12. The character associated with the bad guess is then eliminated from answering again in the current round (word) of the bonus game. The elimination of a character from further participation in the current bonus round is represented by disabling and graying out the five selectable elements in the group associated with that character. In the example illustrated in FIG. 13, the five selectable elements in the group 64 have been disabled and grayed out to indicate they cannot be selected. Now, only the selectable elements in the groups 60 and 62 may be selected.

Figure 14:
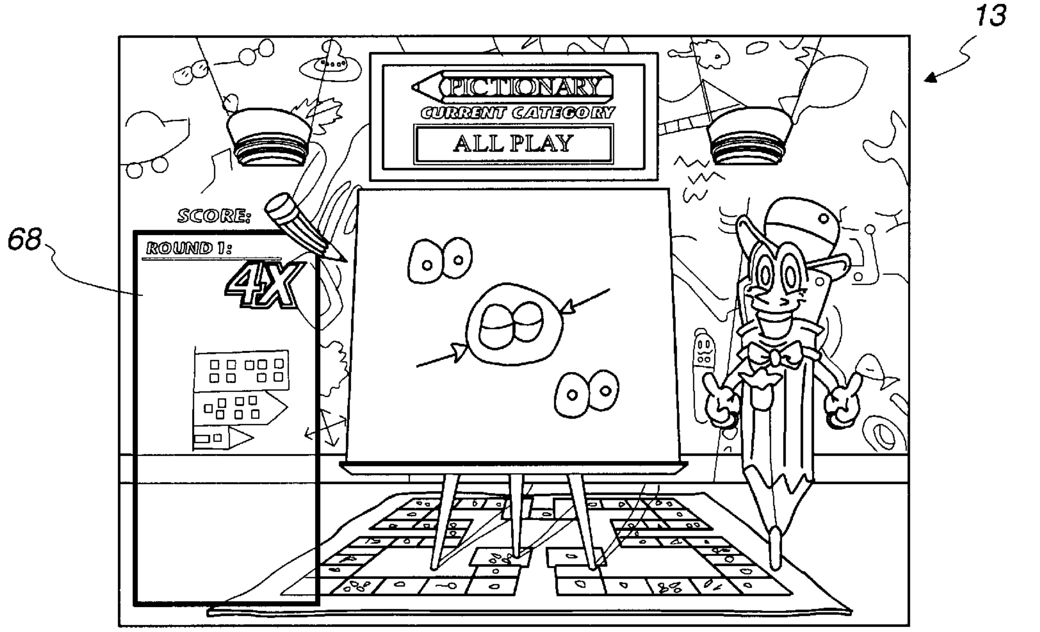
Figure 15:
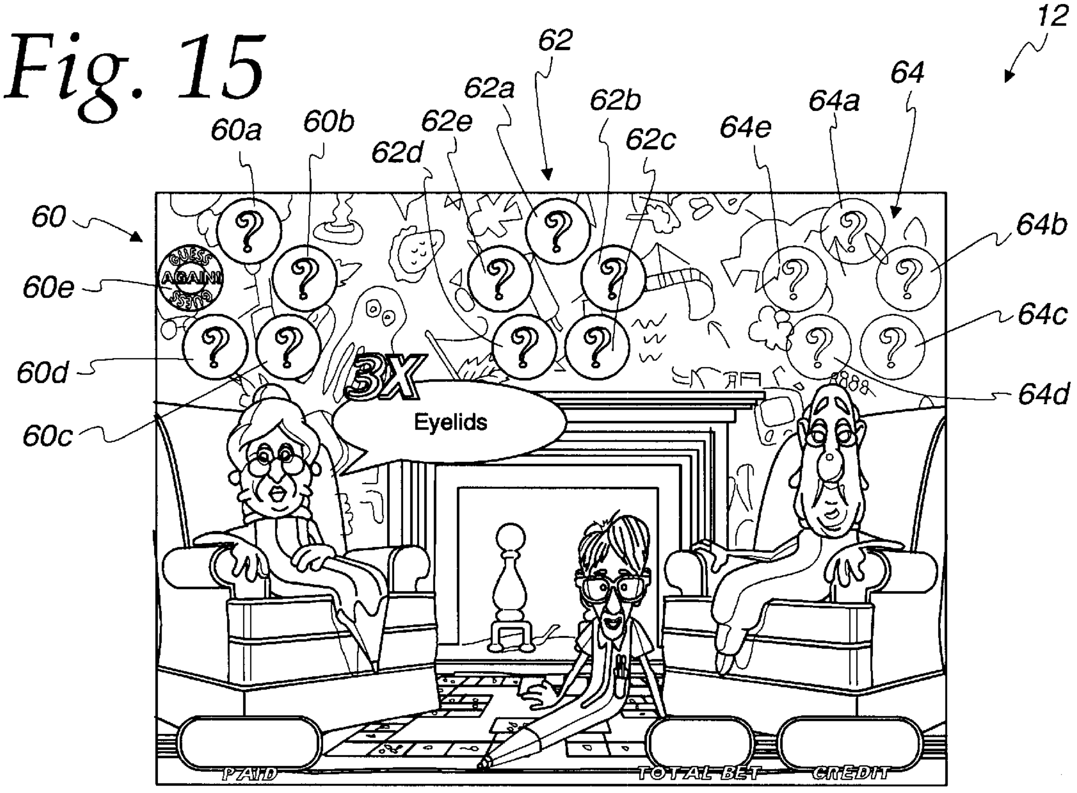

Referring to FIGS. 14 and 15, if a selected element triggers a close but incorrect guess (e.g., "Eyelids"), the selected element reveals a "Guess Again" indicia and a payout is revealed next to the character associated with the close guess as shown in FIG. 15. The payout is added to the scorecard 68 as shown in FIG. 14. In the example illustrated in FIG. 15, except for the previously selected element 60*e,* the remaining selectable elements in the groups 60 and 62 may still be selected.

Figure 16:
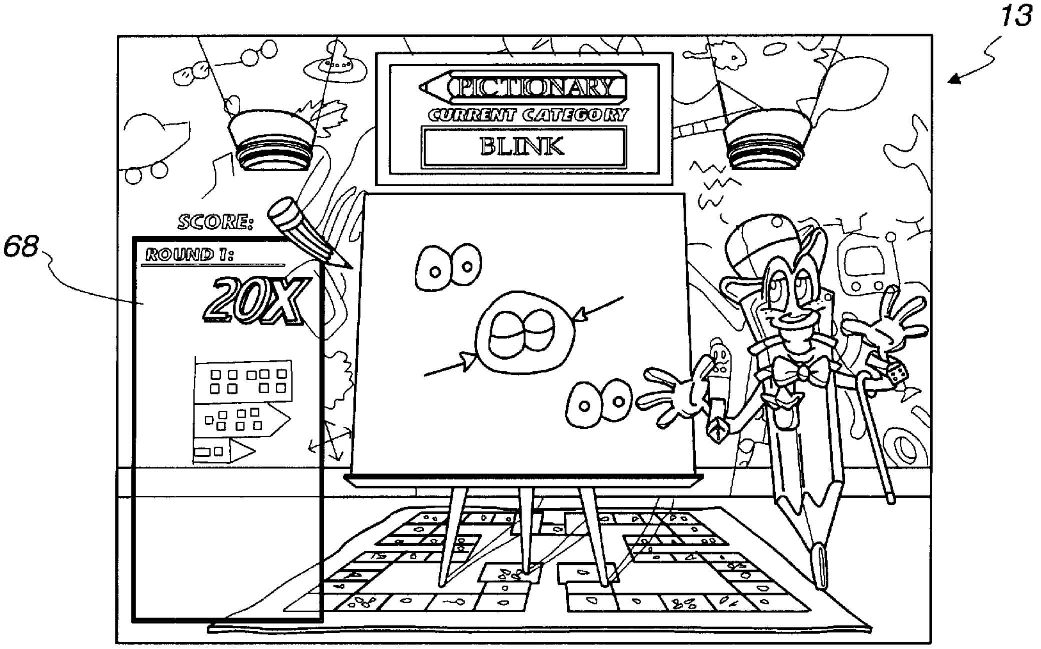
Figure 17:
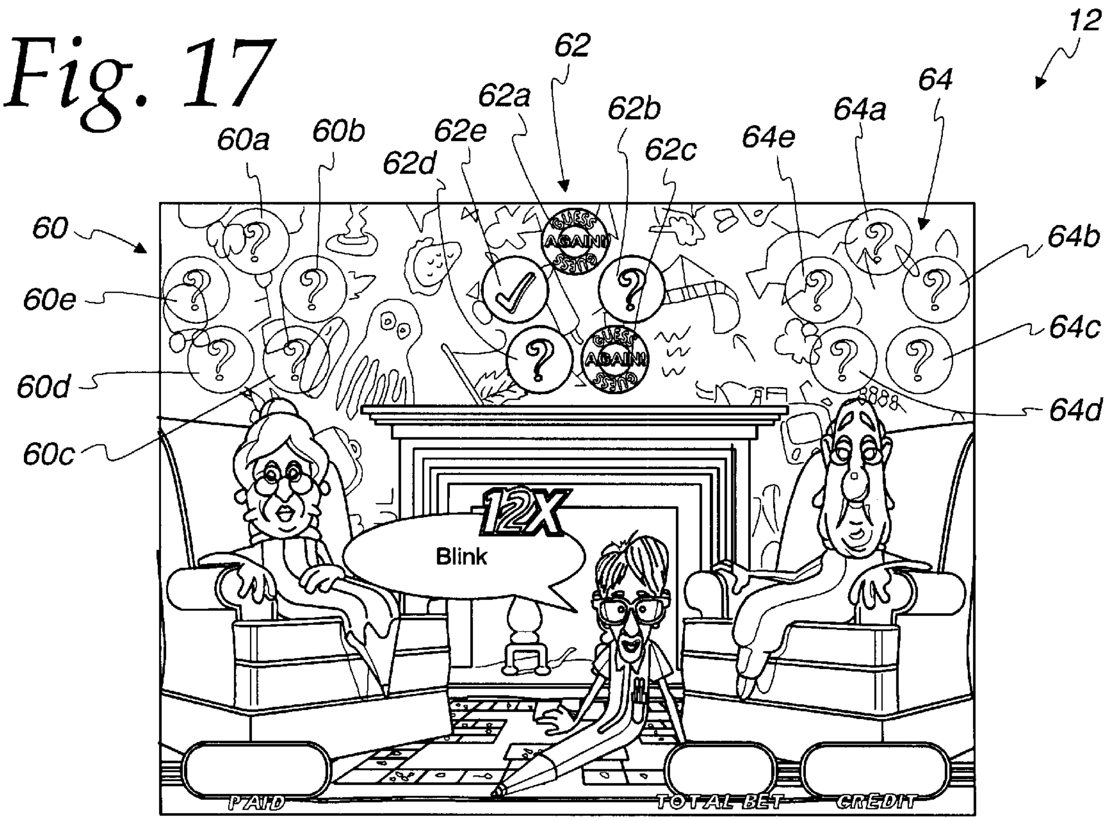

The bonus round continues until either (1) a selected element triggers a correct guess or (2) an element triggering a bad guess has been selected in each of the three groups 60, 62, and 64, whichever occurs first. If the bonus round ends due to (1) above, the bonus game proceeds with another bonus round (except at the end of a third bonus round). If, however, the bonus round ends due to (2) above, the bonus game ends and the CPU shifts operation back to the basic slot game. Referring to FIGS. 16 and 17, it can be seen that the illustrated bonus round has proceeded to the point where an element triggering a bad guess has been selected in each of the groups 60 and 64 so that the player has been limited to selecting elements in the group 62. If a selected element from the group 62 triggers a correct guess (e.g., "Blink") as shown, the selected element reveals a check mark and a payout is revealed next to the character associated with the correct guess as shown in FIG. 17. The payout is added to the scorecard 68 as shown in FIG. 16. The total payout for the illustrated bonus round is 20 multiplied by the player's total wager.

The bonus selection game includes a maximum of three bonus rounds. In each bonus round, Mr. Pictionary draws a new picture on the upper display 13 and the player is presented with three groups of five selectable elements per group on the lower display 12. The selection of an element triggering a bad guess removes or disables all of the selectable elements in the group containing the selected "bad guess" element from the universe of elements that can be subsequently selected during that bonus round. For example, the selection of the "bad guess" element 64*e* from the group 64 in FIG. 13 removes or disables all of the selectable elements in the group 64 from the universe of elements that can be subsequently selected during that bonus round. Only the selectable elements in the groups 60 and 62 may be subsequently selected, while the selectable elements in the group 64 are grayed out to indicate that they cannot be selected. Thus, in response to selecting a "bad guess" element during a bonus round, the universe of selectable elements is modified for that bonus round to remove or disable other elements grouped with the selected "bad guess" element from the universe.

While the present invention has been described with reference to one or more particular embodiments, those skilled in the art will recognize that many changes may be made thereto without departing from the spirit and scope of the present invention. For example, instead of simulating the reels on a video display, the reels may be mechanical and driven by respective stepper motors. If the reels are mechanical, the entire bonus game is animated on one or more upper video displays. Each of these embodiments and obvious variations thereof is contemplated as falling within the spirit and scope of the claimed invention, which is set forth in the following claims.

What is claimed is:

1. A method of conducting a single play of a wagering game on a gaming machine controlled by a processor, comprising:

receiving a wager from a player;

displaying a plurality of groups on a video display, each group including a plurality of selectable members, the groups being discernible to the player when initially displayed and prior to selection by the player of any of the selectable members;

allowing the player to select a member in any of the groups; and if the selected member is associated with a disable function, disabling an unselected one or more of the members in the same group as the selected member such that the disabled members cannot be subsequently selected, and then allowing the player to select a non-disabled member.

2. The method of claim 1, wherein the disabling step disables all of the members in the same group as the selected member.

3. The method of claim 2, wherein the non-disabled member is in a different one of the groups than the group including the selected member.

4. The method of claim 1, further including awarding a payout based on the selected member.

5. The method of claim 1, further including displaying indicia proximate the member in response to the selected member being selected.

6. The method of claim 3, wherein the indicia indicates whether or not the one or more of the members in the same group as the selected member will be disabled.

7. The method of claim 1, further including displaying a basic game randomly selecting one of a plurality of possible outcomes, the plurality of possible outcomes including a start-feature outcome, and wherein the step of displaying a plurality of groups of is triggered by the start-feature outcome.

8. The method of claim 7, wherein the basic game includes a plurality of symbol-bearing reels that are rotated and stopped to place symbols on the reels in visual association with a display area.

9. A method of conducting a wagering game on a gaming machine controlled by a processor, comprising:

receiving a wager from a player;

displaying a plurality of groups on a video display for a current round of the wagering game, each group including a plurality of selectable members, the groups being discernible to the player when initially displayed and prior to selection by the player of any of the selectable members, the selectable members being associated with a disable group function, a next round function, or other function;

allowing the player to select a member in any of the groups during the current round; and after the displayed member is selected and during the current round;

if the selected member is associated with the disable group function, disabling an unselected one or more of the members in the same group as the selected member such that the disabled members cannot be subsequently selected, and then allowing the player to select a non-disabled member;

if the selected member is associated with the next round function, advancing to a next round in which a fresh plurality of groups of selectable members are displayed on the video display; and if the selected member is associated with the other function, performing the other function.

10. The method of claim 9, wherein the disabling step disables all of the displayed members in the same group as the selected member.

11. The method of claim 10, wherein the non-disabled member is in a different one of the groups than the group including the selected member.

12. The method of claim 9, further including awarding a payout based on the selected member.

13. A method of conducting a single play of a video wagering game, comprising: displaying a plurality of groups, each group including a plurality of selectable members, the groups being discernible to a player prior to selection of any of the selectable members;

allowing the player to select a member in one of the groups; and if the selected member is associated with a disable function, disabling all of the members in the same group as the selected member such that the disabled members cannot be subsequently selected, and allowing the player to select a non-disabled member in another of the groups.

* * * * *